United States Patent
Grewell et al.

(10) Patent No.: US 11,401,686 B2
(45) Date of Patent: Aug. 2, 2022

(54) PIN ASSEMBLY

(71) Applicant: ESCO Corporation, Portland, OR (US)

(72) Inventors: Christopher E. Grewell, Portland, OR (US); Lee A. Zimmerman, Portland, OR (US)

(73) Assignee: ESCO Group LLC, Portland, OR (US)

(*) Notice: Subject to any disclaimer, the term of this patent is extended or adjusted under 35 U.S.C. 154(b) by 700 days.

(21) Appl. No.: 15/710,694

(22) Filed: Sep. 20, 2017

(65) Prior Publication Data

US 2018/0080195 A1     Mar. 22, 2018

Related U.S. Application Data

(60) Provisional application No. 62/397,686, filed on Sep. 21, 2016.

(51) Int. Cl.
*E02F 9/00* (2006.01)
*F16C 11/04* (2006.01)
*E02F 3/58* (2006.01)

(52) U.S. Cl.
CPC ............. *E02F 9/006* (2013.01); *E02F 3/58* (2013.01); *F16C 11/04* (2013.01); *F16C 11/045* (2013.01); *F16C 2226/62* (2013.01); *F16C 2350/26* (2013.01)

(58) Field of Classification Search
CPC . E05D 5/12; F16G 15/04; F16G 15/06; E02F 3/46; E02F 3/48; E02F 3/52; E02F 3/58; E02F 9/006
See application file for complete search history.

(56) References Cited

U.S. PATENT DOCUMENTS

| | | | | |
|---|---|---|---|---|
| 620,914 | A | * | 3/1899 | Griffith .................. F16G 15/06 |
| 958,645 | A | * | 5/1910 | Johnson ................ F16G 15/06 |
| 4,102,124 | A | | 7/1978 | Swager |
| 4,134,255 | A | * | 1/1979 | McBain ................ F16G 13/00 59/78 |
| 4,337,614 | A | * | 7/1982 | Briscoe ................ F16G 15/06 411/518 |
| 5,009,017 | A | | 4/1991 | Diekevers et al. |
| 5,367,798 | A | | 11/1994 | Hughes |
| 5,577,858 | A | * | 11/1996 | Kasim ..................... E02F 3/58 403/157 |
| 5,865,557 | A | | 2/1999 | Kasim |
| 5,966,849 | A | | 10/1999 | Moehnke et al. |
| 6,467,203 | B2 | * | 10/2002 | Pippins ................ E02F 9/2833 37/452 |
| 6,694,571 | B2 | | 2/2004 | Albright et al. |
| 9,086,118 | B2 | * | 7/2015 | Campbell .............. F16G 15/06 |
| 9,115,742 | B2 | | 8/2015 | McClanahan et al. |
| 2013/0136570 | A1 | | 5/2013 | Colwell et al. |
| 2016/0061239 | A1 | | 3/2016 | Heaphy et al. |

FOREIGN PATENT DOCUMENTS

CN       103362166       10/2013
WO    WO 2016/019412    2/2016

* cited by examiner

*Primary Examiner* — Michael P Ferguson
(74) *Attorney, Agent, or Firm* — Palmer Dzurella; Steven Schad; John Anderton

(57) ABSTRACT

A pin for pivotally connecting two components together is received in aligned openings of the two components. One end of the pin has a head of reduced dimension to be received in a correspondingly-shaped opening in one of the components. Axial movement of the pin in the openings is limited by a lock that engages the head of the pin.

9 Claims, 5 Drawing Sheets

PIN ASSEMBLY

FIELD OF THE INVENTION

The present invention relates to pinned connections used to join components that rotate about the pin axis relative to each other for earth working applications.

BACKGROUND OF THE INVENTION

Pins are commonly used to join components that rotate in relation to each other. A pin passes through openings in each of the components and is retained by mechanical means such as by use of a retainer(s) on the pin or component. The openings and the pin surface form bearing surfaces as the components pivot.

Mining equipment uses pins extensively to join large components used in abrasive environments. FIG. 1 shows a dragline bucket system 10 used in open pit mining operations with rigging for moving the bucket. The rigging handles extreme loads in pulling the bucket to collect earthen material and lifting the filled bucket. The bucket 12 is pulled forward by drag chain 16 attached to hitch 18 on the front of the bucket and to the drag cables by drag links 14. Teeth on the lip of the bucket engage and initially gather the earthen materials into the bucket.

Once filled, the bucket is lifted by cables connected to an upper hoist rigging assembly 20 connected to trunnions 26 of the bucket by upper hoist chains 22 and lower hoist chains 24. Once lifted off the ground, the bucket can be repositioned to a dump site for spoiling material. When tension is released on the drag link, the dump cable 28 passing through the dump block 30 releases allowing the bucket to rotate about the trunnion point well back of the center of gravity and tip forward so that the earthen materials are dumped from the bucket. The connections between the cables, chains, rigging parts and the bucket include pins to secure the components to adjacent components.

In such environments, the pins and the components can wear quickly and require frequent replacement. Dirt, rocks, and other debris abrade the dragline bucket and the rigging as they contact or slide against the ground. Connections between the various components also experience wear in areas where surfaces of the elements bear against each other and are subjected to tensile, compressive, or various other forces. Downtime for inspection and replacement of worn components increases operational expenses.

SUMMARY OF THE INVENTION

Pinned connections are used in a wide variety of excavating, earth working or other heavy applications including, e.g., mining and construction. As one example, pinned connections or pin assemblies are used in rigging to support and operate dragline buckets.

In one embodiment, a pin is received in aligned openings of two components. One end of the pin has a head of reduced dimension to be received in a correspondingly-shaped opening in one of the components. Axial movement of the pin is limited by a lock that engages the head of the pin.

In another embodiment, a pin assembly for earth working equipment includes a pin having a body and a head where the head has a reduced dimension relative to the body, a first component with a first opening, and a second component with a second opening. The first and second openings receive the pin to couple the components together. The first opening has a reduced portion that corresponds to the reduced dimension of the head to resist rotation of the pin relative to the first component. A lock prevents removal of the pin from the first and second components.

In another embodiment, a pin assembly for earth working equipment includes a pin with a distal end having spaced sides defining a reduced thickness, and a proximal end. A body with at least one opening receives the pin to couple the body to at least one other part. The opening includes a slot with spaced sides to matingly receive the spaced sides of the pin. A hole extends transverse to the opening and communicates with the opening. A hammerless lock secured in the hole is adjustable to alternatively retain the pin in the opening and release the pin to permit installation and removal of the pin into and from the opening. The lock is retained to the body in the hole when holding the pin and when releasing the pin.

In another embodiment, a pin assembly for earth working equipment includes a first pin having a cylindrical body with a first diameter, and a head having a thickness that is smaller than the first diameter, and a second pin having a cylindrical body with a second diameter that is less than the first diameter, and a head having a thickness that is the same as the thickness of the head of the first pin. A first component includes a pair of arms with one of the arms having a first opening with a cylindrical portion and a reduced portion, which corresponds to the thickness of the heads of the first and second pins. The other arm includes a second opening having a cylindrical shape. A second component has an end with an aperture received between the arms. The first opening, the second opening and the aperture are aligned to alternatively receive the first and second pins with the head of either of the pins being received into the reduced portion of the first opening to resist rotation of either of the pins relative to the first component. A first bushing is receivable in the first opening and a second bushing receivable in the second opening, each with an inner hole to matingly receive the second pin. A lock is secured to the one arm to engage the head of either of the pins to prevent removal of either of the pins from the aligned openings.

In another embodiment, a pin assembly component for earth working equipment includes a body having first and second arms spaced apart to receive a second component between the arms. The first arm includes an opening with an inner portion having a cylindrical shape and an outer portion with opposing side surfaces defining a slot that is smaller in at least one transverse dimension than the first portion, where each of the first and second portions receive a section of a pin. A hole extends through the body and opens in the slot to receive a lock to engage the pin and retain the pin in the slot. The second arm includes a cylindrical opening aligned with the opening in the first arm to receive a section of the pin to pivotally couple the second component to the first component.

In another embodiment, a pin assembly component includes a body having at least one opening into which a pin is received to couple the pin assembly component to at least one other part. One opening closes to a slot with spaced sides that receives a head of the pin with spaced sides. A hole extends transverse to and communicates with the slot. A lock is secured in the hole and is adjustable to alternatively retain the pin in the opening and release the pin to permit installation and removal of the pin from the opening.

In another embodiment, a rigging component includes a pin with a flat at a first end and a hole in the flat, and a body including a first arm with a first opening and a second arm with a second opening where the openings are aligned with each other to define a passage for receiving the pin to couple the body to another part. An end of the first opening is reduced to define a flat that engages the flat on the first end of the pin to prevent rotation of the pin relative to the body. The first arm includes a hole extending transverse to the passage and to the flat of the reduced opening. A lock is received within the hole such that the lock can be advanced to contact the flat of the pin to retain the pin in the passage and retracted to permit release of the pin in the passage.

In another embodiment, a rigging component includes a body having a pair of arms each of which includes an opening where the openings are aligned with each other to define a passage for receiving a pin. The pin couples the rigging component to another part. One end of an opening reduces to a slot with opposing faces that receives a head of the pin. A hole extends transverse to the passage and communicates with one of said faces to receive a lock within the hole such that the lock can be advanced to contact the head to retain the pin in the passage and retracted to permit axial movement of the pin. In another embodiment the rigging component includes bushings in the openings to receive the pin.

In another embodiment, a pin assembly component for earth working equipment includes a first arm with an elongate opening. The elongate opening has spaced sides and receives a portion of a pin. A hole extending through the arm from an exterior arm surface and opening to one of the spaced sides receives a lock to hold the pin in the elongate opening. In another embodiment the head and opening are elongate transverse to the pin axis.

In another embodiment, a pin for pivotally connecting two components together includes a cylindrical shank having a first diameter and a longitudinal axis, and a head on one end. The head includes (i) a reduced portion having a thickness less than the first diameter and defining oppositely-facing bearing surfaces extending in an axial direction to engage corresponding surfaces on one of the two components to prevent rotation of the pin relative to said one component, and (ii) a transverse hole in the head to receive a lock for securing the pin to one of the components.

In another embodiment, a pin for pivotally coupling components together includes a generally cylindrical shank and a head having a reduced thickness in at least one direction for receipt within a complementary opening on one of the parts.

In another embodiment, a pinned assembly includes parts pivotally coupled together by a pin having a generally cylindrical shank and a head having a reduced thickness in at least one direction for receipt within a complementary opening on one of the parts, and a lock extending through the part to contact the head to inhibit axial movement of the pin and thereby hold the assembly together.

The different inventive concepts can be used independently without the other inventive concepts in a pin assembly to achieve one or more of the various benefits of the present invention.

DETAILED DESCRIPTION OF PREFERRED EMBODIMENTS

Mining operations require large and heavy rigging to handle dragline buckets and other equipment used in open pit mines. The rigging uses pins extensively to hold many of the components together. In operation, these pins are exposed to abrasive particles that infiltrate gaps in the assemblies. These particles, combined with the extreme loads, can limit the service life of the pins and components. Refurbishing the rigging components can require the handling and aligning of parts weighing tons to accommodate the assembly and disassembly of the pins from the components. Handling these large parts is difficult and time consuming, can be dangerous for the workers, and can take the equipment out of service for long periods. The mining application is used as an example. Pin assembly embodiments of the invention are usable in other earth working operations.

Figure 1:
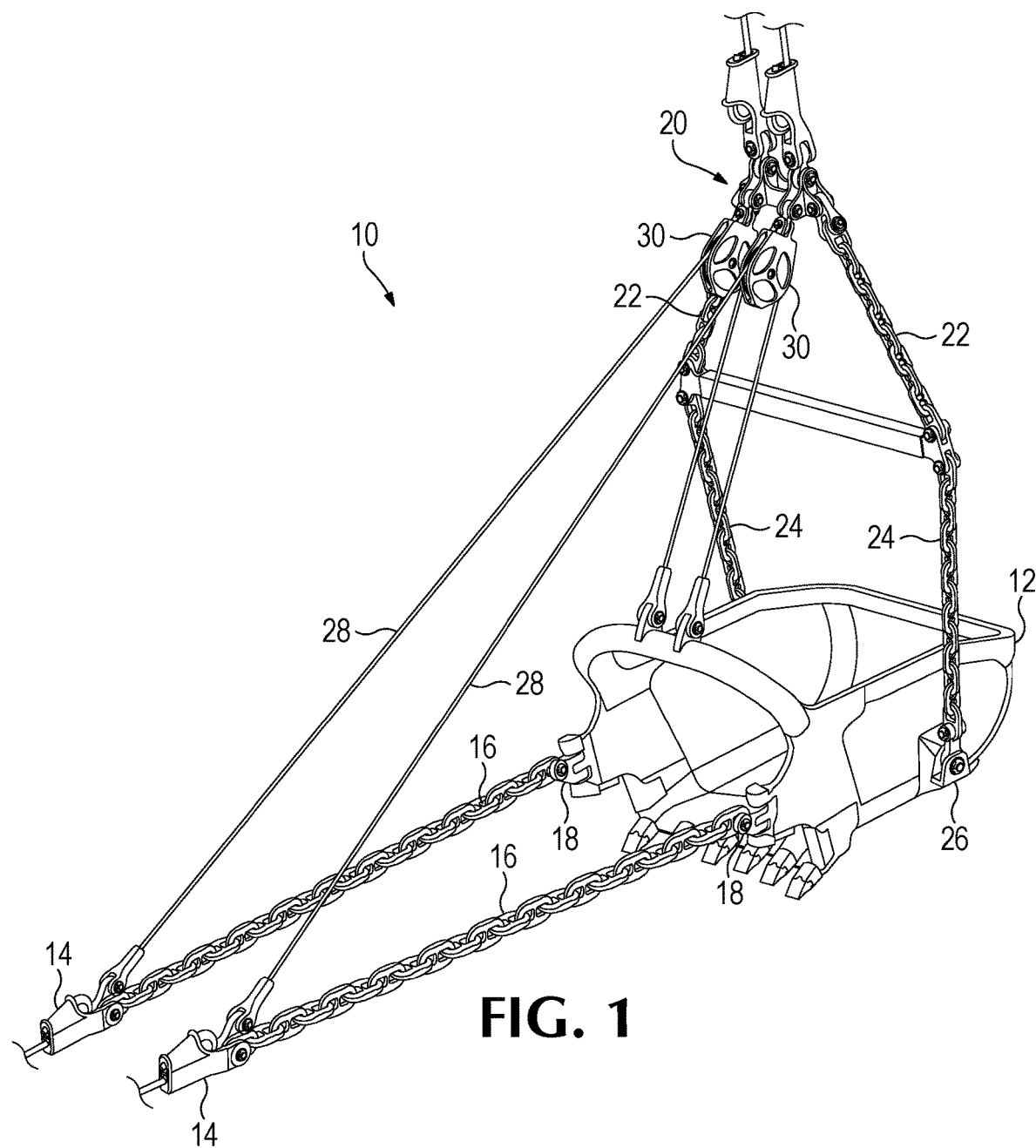
FIG. 1 is a perspective view of a dragline bucket system.
Figure 2:
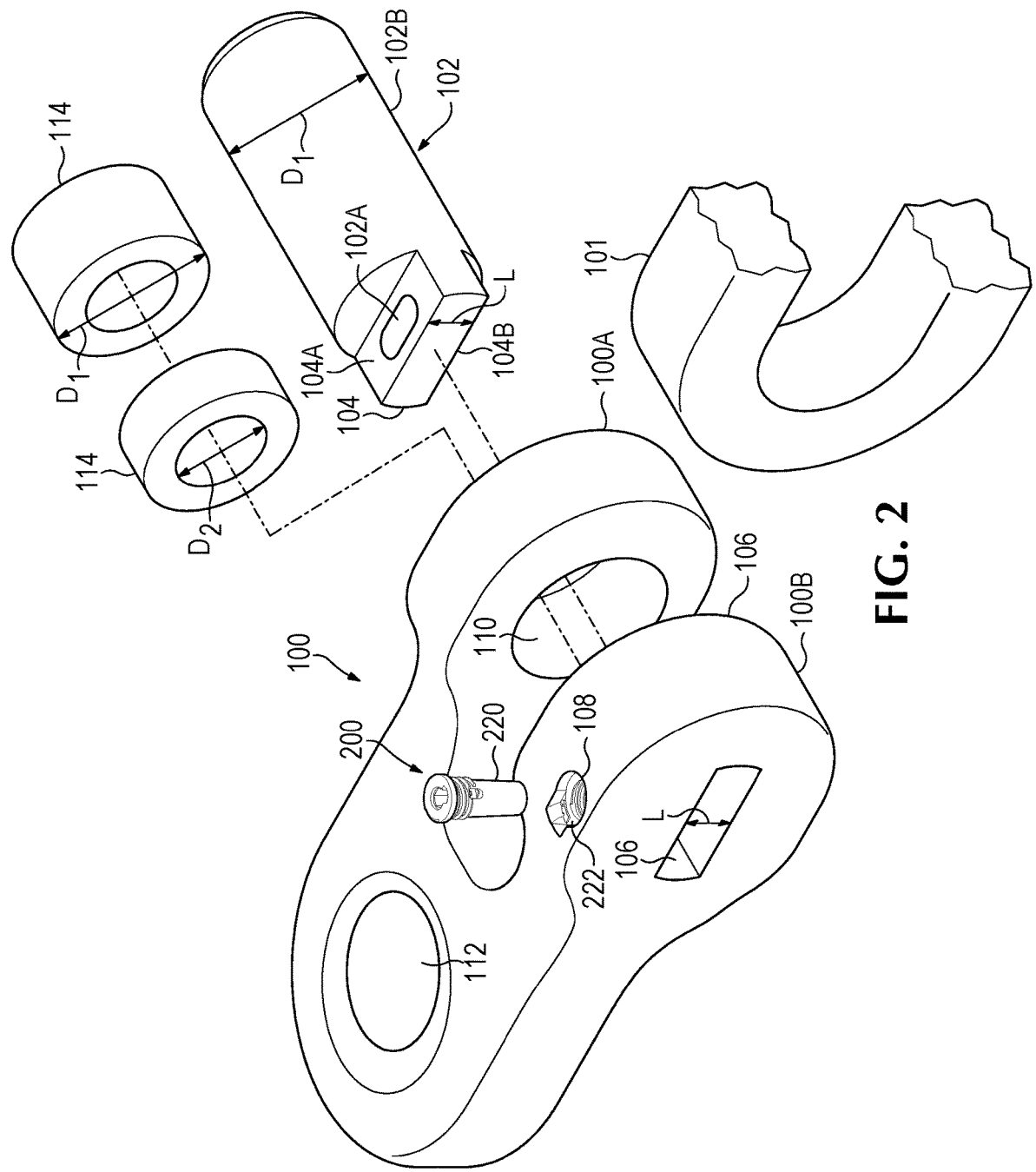
FIG. 2 is an exploded perspective view of a rigging component for the dragline bucket system.
Figure 3:
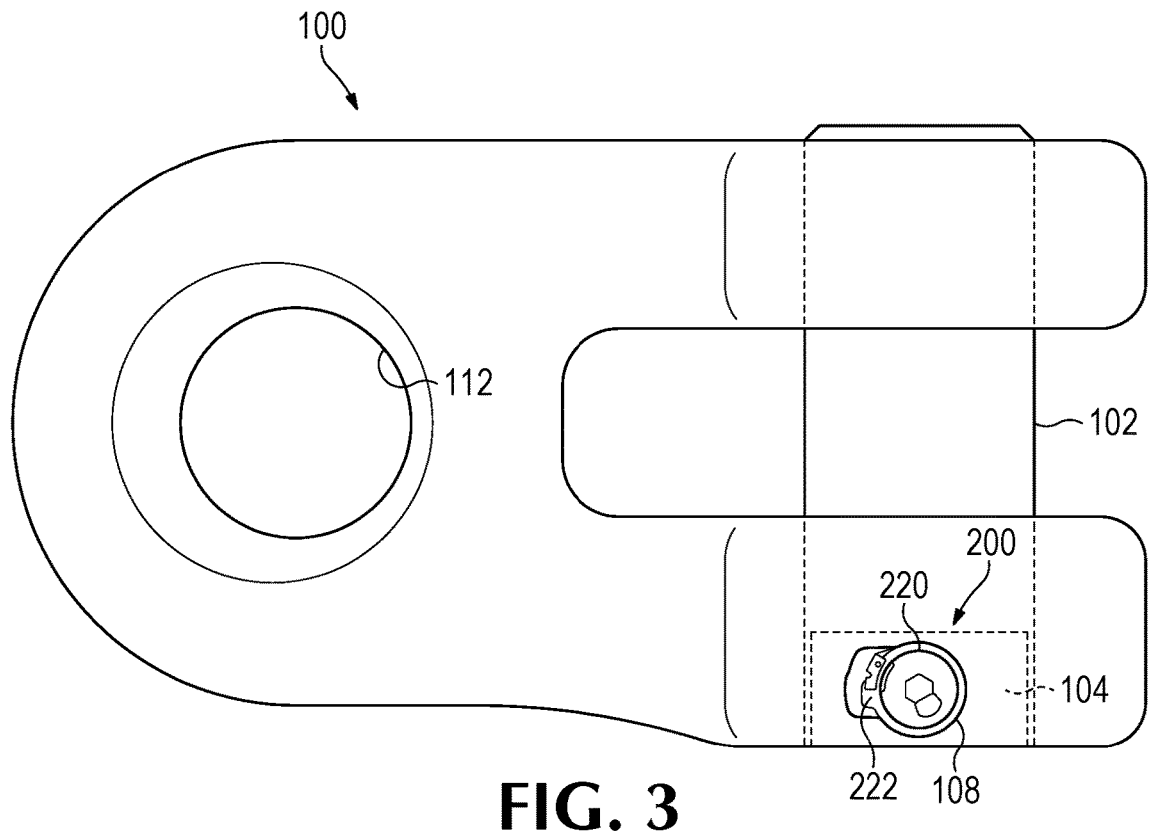
FIG. 3 is a top view of the component of FIG. 2.
Figure 4:
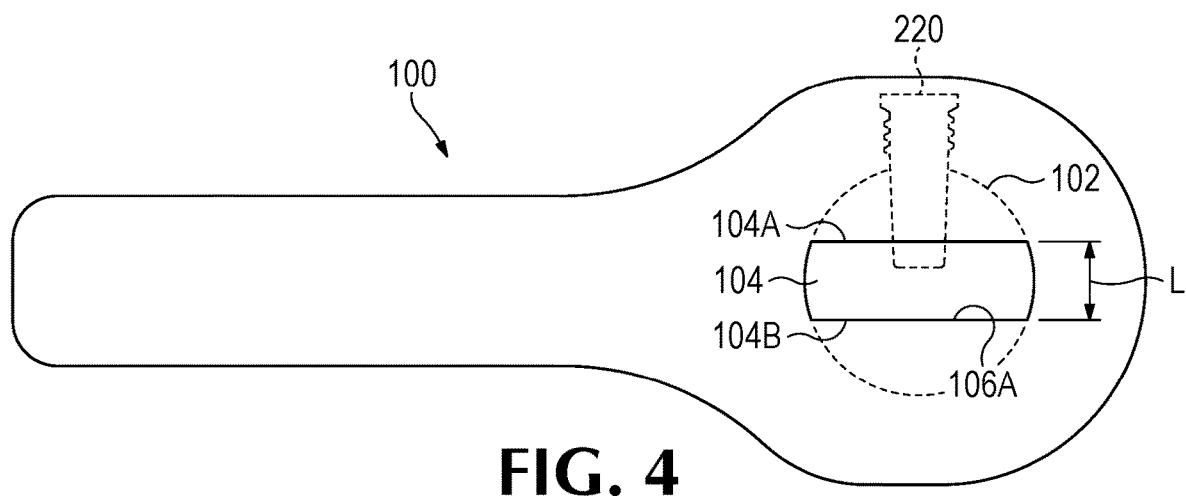
FIG. 4 is a side view of the component of FIG. 2.
Figure 5:
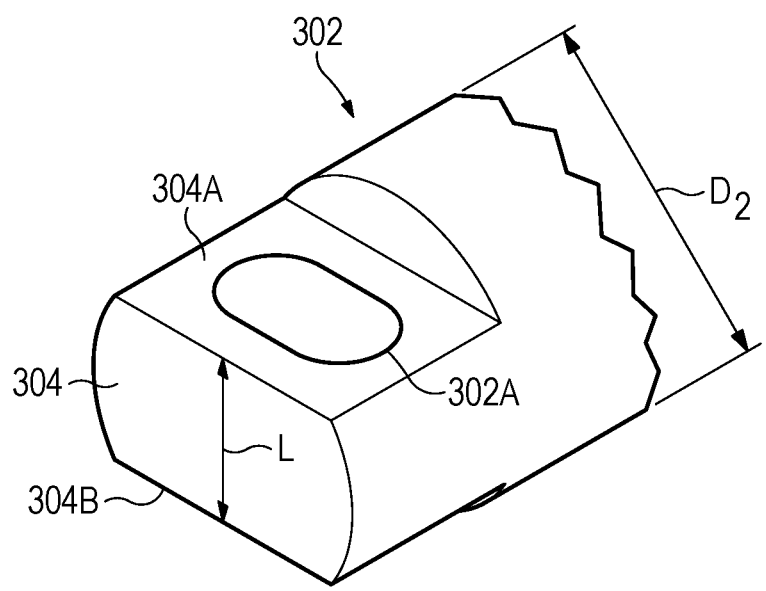
FIG. 5 is a perspective view of second embodiment of a pin.
Figure 6:
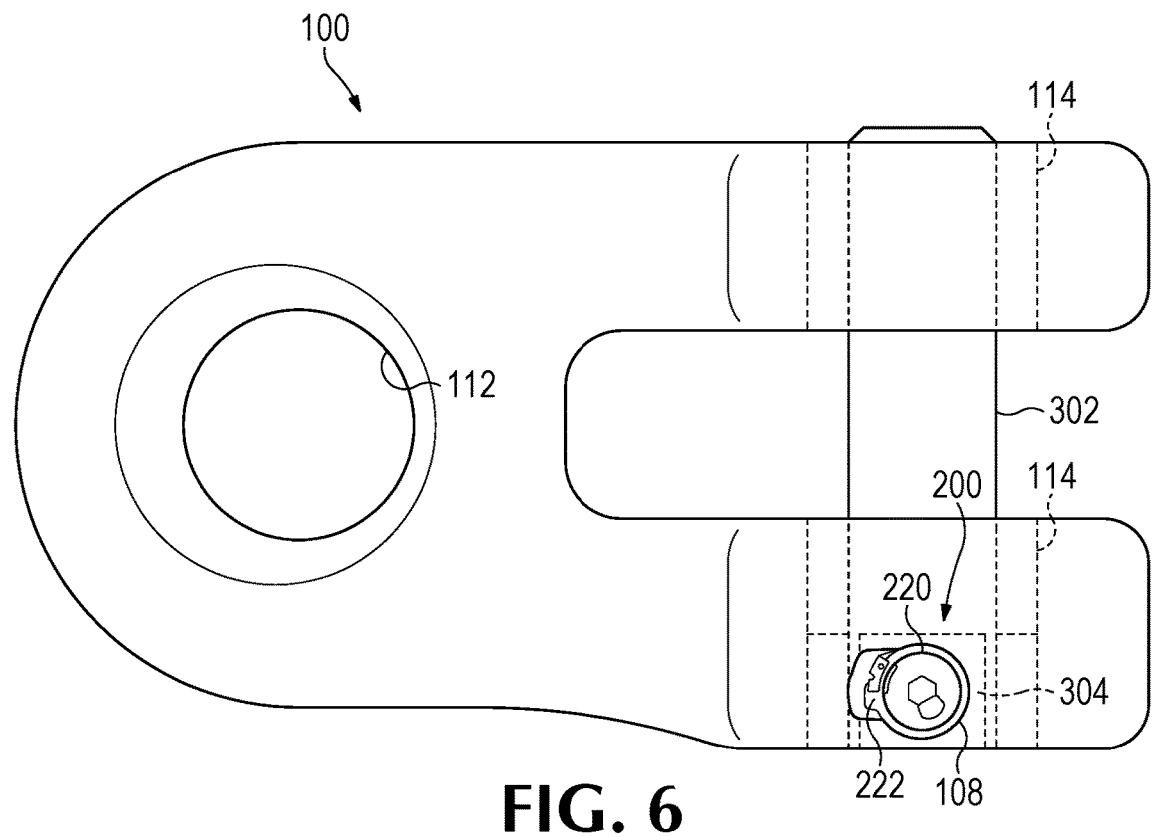
FIG. 6 is a top view of a rigging component with the second embodiment of the pin of FIG. 5.
Figure 7:
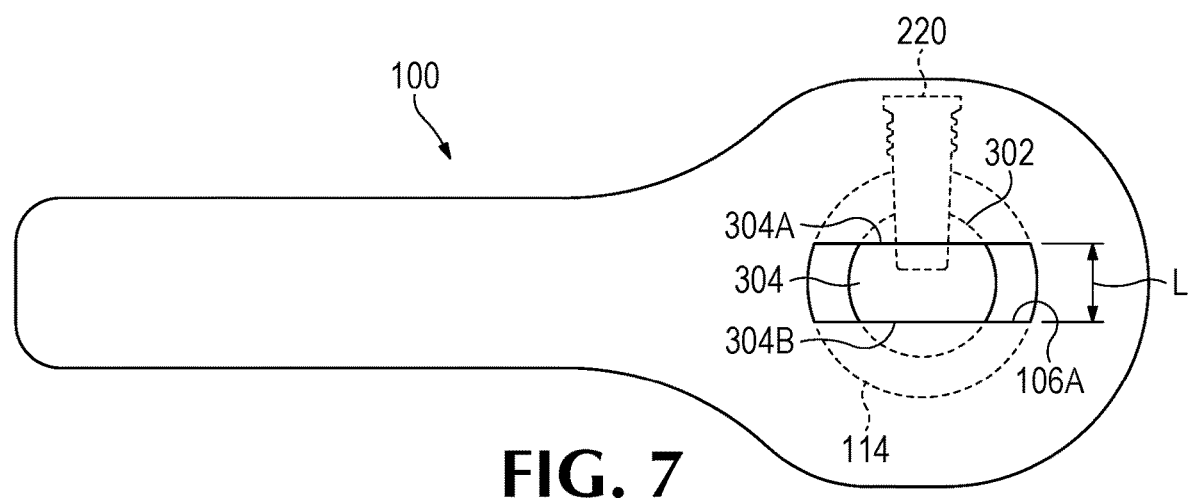
FIG. 7 is a side view of the rigging component and pin of FIG. 5.

A pin assembly that provides for efficient installation and extraction of the pin is generally shown in FIGS. 2-4. A Y-link 100 is a common rigging component (FIG. 2) for connecting different components and is used herein as an example. Link or component 100 includes a body with arms 100A and 100B extending in the same general direction (FIGS. 2-4). Each arm has an opening or aperture 106 and 110. Another rigging component 101 (FIG. 2) is received between arms 100A and 100B. An additional component may also connect to link 100 at opening 112. An opening or aperture of the rigging component 101 is aligned with openings 106 and 110 between arms 100A, 100B. The aligned openings accept a pin 102 with a shaft or shank 102B and a head 104 to join the components.

Pin 102 can have a cylindrical shank with a diameter D1 corresponding to the diameter of openings 106 and 110. Bushings 114, 114' can be provided in openings 106, 110 to receive the pin but are not essential. When bushings are provided a pin 302 with a diameter of D2 is used and the inner holes of the bushings matingly receive the pin shank. Head 104 is on one end of the pin with opposite bearing surfaces or faces 104A and 104B defining a thickness or dimension L between the faces. One or both faces preferably includes a retaining formation, which in the illustrated embodiment is a hole 102A that receives a portion of lock 200 to limit axial movement of pin 102 in the openings during operation.

Opening 106 of arm 100B has at least a portion of reduced size to define a slot 116 with opposed bearing surfaces or faces 116A and 116B. Slot 116 has a dimension L (i.e., with a suitable tolerance) to receive head 104 such that bearing surfaces 104A, 104B of the head contact bearing surfaces 116A, 116B of the slot to prevent rotation of the pin relative to link 100. In one embodiment, slot 116 defines an outer portion of opening 106 and is in communication with the larger inner portion 107 of the opening 106 receiving the bushing 114 or cylindrical pin shank 102B. In another embodiment, slot 116 is the entire opening 106 and extends through arm 100B. The pin head 104 at the end of the pin is received in slot 116. Head 104 can be flush or can be recessed from the outer face of the arm when installed or can extend beyond the arm. Pin head 104 received in slot 116 limits pin rotation in openings 106, 110 during operation. Previous designs used a lock engaging the cylindrical portion of the pin to limit pin rotation which subjected the lock to cyclical shear forces. Pin rotation limited by the pin head in the slot in the present invention limits stress on the lock engaging the pin.

Faces 104A and 104B are preferably flat and parallel, but could be curved and/or axially tapered or have another configuration that corresponds to the slot 116 with a thickness dimension less than the pin shank diameter. An axis LA of pin 102 aligns with the opening axis when inserted. The axis of the openings corresponds to an axis of the slot 116. Alternatively, the slot and the head of the pin can be offset from the axis of the non-reduced portion of the openings.

The slot and head can be elongate extending transverse to the axis of the pin. Alternatively, the slot and head can be square or other shape. The head of the pin is of reduced dimension from the pin diameter in at least one direction. The head can be machined from round bar stock which is typically a cylindrical piece of metal. A single flat could be formed in the pin to define the head. Flats on opposite sides can be machined into the round bar stock. More than two flats can also be machined into the round bar stock. For example, the round bar stock can be machined to form other pin head configurations than opposed flats. The pin could be manufactured in other ways.

Arm 100B includes a hole or lock passage 108 extending generally transverse to the axis of the aligned openings 106, 110. Lock passage 108 receives and retains lock 200. Lock 200 can be similar to locks disclosed in U.S. application Ser. No. 13/547,353 and U.S. application Ser. No. 14/838,900 which are herein incorporated by reference in their entirety, or it could have another construction. Lock 200 is retained in lock passage 108 and when engaged to the pin 102 at recess 102A restrains axial movement of the pin in openings 106 and 110 to prevent loss of the pin. A retaining feature 108A on the wall of the passage can engage lock 200 to retain the lock. Other kinds of locks could be used to secure the pin against axial movement.

In the illustrated embodiment, lock 200 can include a mounting component or collar 222 and a retaining component or lock pin 220. The lock pin 220 and collar 222 can be threaded (though other arrangements are possible) so that pin 220 advances through the center of the collar 222 between two positions when rotated. The first position is a release position where the pin is retracted to permit installation and/or removal of the pin into and/or from the components. For ease of use, lock 200 is preferably retained in component 100 at all times, but could be inserted and/or removed as needed. Pin 220 is preferably set in the release position during shipment, storage, installation and removal, though other arrangements are possible. As examples, the pin could be removed in any of these capacities, or it could be in other positions during shipment and/or storage.

The lock pin 220 advances into the second position, i.e., a hold position, after rotating to engage a retaining formation 102A, which in this example is a hole 102A in the head of pin 102. Pin 220 engages hole 102A to restrain axial movement of the pin. To remove pin 102, the lock pin 220 is rotated counter-clockwise to retract the lock pin. Stops are preferably included in lock 200 to set the lock pin in pre-established release and/or hold positions. The stops can include a biased latch on the lock pin or collar, which is received into a corresponding recess in the other of the lock pin or collar. The stops could have other constructions. Also, opening 108 could be formed to cooperate with lock pin 220 directly without the use of collar 222. Lock 200 secures pin 102 to link 100. In the preferred construction, one lock 200 holds pin 102 to link 100. Alternatively, two or more locks could be used to secure the pin to the component. Alternatively, the lock could be included in arm 100A to engage a cylindrical portion of the pin. Alternatively, the lock could be included in arm 100A to engage opposite end face of the pin to block axial movement of the pin in the removal direction; movement in the insertion direction would be blocked by the reduced portion 116 of opening 106.

The arm can have two lock passages on opposite sides. A passage on a first side can receive a lock to engage side 104A of the pin head. Instead or in addition, a lock installed to the other side can engage side 104B of the pin head. A second passage can provide an alternate lock position if the first passage is damaged or blocked. Two lock passages on opposite sides also allows the installer to install a lock from the top or side, regardless of the position of the link.

Recess or hole 102A can extend part way through head 104 or can extend through the head to open at surfaces 104A and 104B. Hole 102A preferably forms a slot with a length greater than its width. As pin 102 and the openings or bushings receiving the pin erode and wear, the pin may shift position laterally in relation to the lock. The extended length of the opening accommodates the lateral shift of the pin with wear without applying a bending force to the lock. Alternatively, the hole can be a round or have other shapes. Other means, such as flanges on head 104, can be used to contact the lock and prevent axial movement of the pin. The lock could alternately tightly engage head 104 without a hole, flange or other configuration on the head to hold the pin against axial movement.

The link 100 can accept pins of different diameters. Openings 106, 110 can be adapted to receive a pin 302 with a shank having a smaller diameter D2 than the diameter D1 of pin 102. Each opening can receive bushings 114, 114', each with an inner diameter D2 corresponding to the pin and an outer diameter D1 corresponding to openings 106, 110. Head 304 of pin 301 has faces 304A and 304B with a spaced distance L, but could have other shapes such as noted above for pin 102. This arrangement permits virtually any size pin (i.e., between D1 and L) to be used interchangeably in link 100 provided suitable bushings are available. One or both faces preferably includes a hole or recess 302A that receives lock 200. The head of the pin regardless of the diameter of the pin will preferably have faces spaced a distance L that corresponds to dimension L of slot 116. This allows the head to be received in slot 116 regardless of the diameter of the pin, and the lock 200 to engage the head (e.g., in recess 102A) at the same position relative to the opening regardless of the diameter of the pin. Head 104 is shown with a width equal to the diameter D1 of the pin body though the head could be smaller than the diameter of the pin body.

The use of a pin in accordance with the present invention provides the benefit that rotational forces on the pin are transferred at the faces of the head of the pin and slot of the link rather than at the lock engaging recess 102A. The lock can be sized to only oppose axial movement of the pin rather than axial movement and rotation of the pin. This allows for a smaller lock and recess than conventional configurations. The ability to use different pin sizes with the same body provides operators greater latitude of operation. The pins can be easily machined from raw stock and the bushings are readily available. During maintenance the lock can be retracted and the pin can be rotated 180° to present an unworn engagement face of the pin and extend the service life of the pin. With a square head, the pin could be similarly rotated 90°. With a head on both ends of the pin the pin could be removed, flipped end to end and reinserted in the aligned holes of the arms.

In use, the arms 100A, 100B tend to deflect outward under load. In conventional links where the pin is engaged at both ends (i.e. by a head at one end and a lock at the other or by a lock at each end), and the arms deflect outward under load, stress can be concentrated at the lock causing failure. Restraining the pin on only one end allows the link to flex and the arms to deflect outward under load without putting stress on the lock. Again a smaller lock can be used where the pin is restrained at one end. While restraining the pin at only one end is preferred, a lock could be provided at both ends.

A link is depicted here as an example only for the purpose of illustration. The inventive concepts can be applied to a range of pinned components in addition to a Y-link. For example, the above-discussed constructions could be used to secure two components together where neither component has two arms to receive the other component.

While the application has described specific embodiments, the invention could also be employed in other applications where pins are used to join components together. It is believed that the disclosure set forth herein encompasses multiple distinct inventions with independent utility. While a lock for a pin has been disclosed in its preferred form, the specific embodiments thereof as disclosed and illustrated herein are not to be considered in a limiting sense as numerous variations are possible. While different configurations have been described to achieve a specific functionality, combinations of these configurations may be used and still fall within the scope of this disclosure. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

The invention claimed is:

1. A rigging assembly for earth working equipment comprising:
    a pin having a body of circular cross-section and uniform dimension extending from one end of the pin to a head having a non-circular cross-section and a reduced dimension relative to the body, the head extending outward from the body of the pin to an opposite end of the pin and including a retaining formation to receive a lock;
    a first component includes two arms, one of the arms includes a first opening and the other arm includes a third opening coaxially aligned with the first opening and a transverse opening communicating with the third opening for receiving the lock, wherein the lock is movable in the transverse opening to engage the pin, the third opening having a first portion to receive the body of the pin and a second portion with a reduced thickness as compared to the thickness of the first opening and the first portion of the third opening that receives the reduced dimension of the head to resist rotation of the pin relative to the first component;
    a second component to be received between the arms and includes a second opening, wherein the first, second and third openings receive the pin with the second component between the first and third openings; and
    a lock movably received within the transverse opening of the first component between a released position and a locked position in which the lock engages the retaining formation of the head to prevent removal of the pin from the first and second components.

2. A rigging assembly in accordance with claim 1 wherein the second and third openings each has a cylindrical shape, and the third opening has a cylindrical portion between the reduced portion and the second component.

3. A rigging assembly in accordance with claim 2 wherein the head includes oppositely-facing, flat bearing surfaces to define the reduced dimension and contact corresponding surfaces in the third opening.

4. A rigging assembly in accordance with claim 3 wherein the retaining formation is a hole being transverse to at least one of the oppositely facing bearing surfaces.

5. A rigging assembly in accordance with claim 2 wherein bushings are received in each of the first and third openings to receive the pin.

6. A rigging assembly in accordance with claim 1 wherein the head includes oppositely-facing, flat bearing surfaces to define the reduced dimension thickness therebetween that is less than the thickness of the pin body.

7. A rigging assembly for earth working equipment comprising:
    a pin including a body with a circular cross section extending from a proximal end of the pin to a head, the head having spaced planar sides defining a reduced thickness extending outward to a distal end of the pin, wherein at least one of the spaced planar sides includes a lock hole transverse to at least one of the spaced sides;
    a first component comprising a body including a pair of arms each having one of a pair of coaxially aligned openings for receiving the pin, to couple the body of the pin to at least one other part, one of the openings including a first portion to receive the body of the pin and a second portion formed as a slot with spaced planar sides with a reduced thickness as compared to the thickness of the other opening and the first portion of the opening to matingly receive the spaced sides of the head to resist rotation of the pin relative to the first component, and a hole extending transverse to and communicating with the second portion of the opening, wherein when the pair of openings receive the pin the lock hole aligns with the hole in the first component; and
    a hammerless lock movably secured in the hole in the first component to engage the lock hole on the head of the pin to retain the pin in the opening and which is adjustable from a locked position to a released position permitting installation and removal of the pin into and from the opening without removal of the lock.

8. A rigging assembly in accordance with claim 7 including a bushing in each said opening of the body.

9. A rigging assembly in accordance with claim 7 wherein the spaced sides of the slot are parallel.

* * * * *